US010262697B1

(12) United States Patent
Singer (10) Patent No.: US 10,262,697 B1
(45) Date of Patent: Apr. 16, 2019

(54) SYSTEMS AND METHODS FOR GENERATING AUDIO OR VIDEO PRESENTATION HEAT MAPS

(71) Applicant: Matthew Benjamin Singer, New York, NY (US)

(72) Inventor: Matthew Benjamin Singer, New York, NY (US)

(73) Assignee: Videolicious, Inc., New York, NY (US)

( * ) Notice: Subject to any disclaimer, the term of this patent is extended or adjusted under 35 U.S.C. 154(b) by 0 days.

(21) Appl. No.: 16/180,506

(22) Filed: Nov. 5, 2018

Related U.S. Application Data (63) Continuation of application No. 15/984,049, filed on May 18, 2018, now Pat. No. 10,121,517.

(60) Provisional application No. 62/644,113, filed on Mar. 16, 2018.

(51) Int. Cl.
*G11B 27/36* (2006.01)
*G11B 27/34* (2006.01)

(52) U.S. Cl.
CPC .............. *G11B 27/36* (2013.01); *G11B 27/34* (2013.01)

(58) Field of Classification Search
CPC .... G06Q 10/107; H04L 41/026; G11B 27/36; G11B 27/34; G11B 27/10; G10L 15/26; H04H 60/37; H04H 60/58; H04H 60/31; H04N 21/44222; H04N 21/44204
See application file for complete search history.

(56) References Cited

U.S. PATENT DOCUMENTS

| | | | | | |
|---|---|---|---|---|---|
| 4,511,917 A | * | 4/1985 | Kohler | ............... | G10L 15/00 324/76.12 |
| 5,594,934 A | * | 1/1997 | Lu | .............. | H04H 60/372 455/2.01 |
| 6,260,011 B1 | * | 7/2001 | Heckerman | ........... | G09B 5/062 704/235 |
| 6,882,707 B2 | * | 4/2005 | Engelke | ............ | H04M 1/64 379/52 |
| 7,181,392 B2 | * | 2/2007 | Gandhi | .............. | G10L 15/01 704/235 |
| 8,281,231 B2 | * | 10/2012 | Berry | ............... | G11B 27/10 715/201 |
| 9,124,769 B2 | * | 9/2015 | Srinivasan | ........... | H04N 7/163 |
| 2002/0103656 A1 | * | 8/2002 | Bahler | .............. | G10L 17/24 706/14 |
| 2003/0004724 A1 | * | 1/2003 | Kahn | ................ | G10L 15/063 704/260 |
| 2004/0088162 A1 | * | 5/2004 | He | ................. | G10L 15/063 704/235 |
| 2005/0209859 A1 | * | 9/2005 | Tenembaum | ...... | G09B 21/009 704/277 |
| 2006/0235933 A1 | * | 10/2006 | Baluja | ............. | G06Q 10/107 709/207 |

(Continued)

FOREIGN PATENT DOCUMENTS

JP    2002077315 A  *  3/2002
JP    2003188948 A  *  7/2003

*Primary Examiner* — David E Harvey
(74) *Attorney, Agent, or Firm* — Kelley Drye & Warren LLP (57) ABSTRACT

Systems and methods for creating and distributing presentations and determining on an individual or aggregate basis the extent to which the presentations are viewed by the intended recipients. Speech recognition software may be used to provide a detailed analysis of presentation playback.

19 Claims, 5 Drawing Sheets

(56) References Cited

U.S. PATENT DOCUMENTS

| | | | |
|---|---|---|---|
| 2008/0177534 A1* | 7/2008 | Wang | H04M 3/002 |
| | | | 704/211 |
| 2009/0198690 A1* | 8/2009 | Shi | G06F 16/30 |
| 2010/0262922 A1* | 10/2010 | Fan | G06Q 10/107 |
| | | | 715/752 |
| 2012/0005701 A1* | 1/2012 | Quan | G10L 15/20 |
| | | | 725/9 |
| 2014/0088962 A1* | 3/2014 | Corfield | G10L 15/26 |
| | | | 704/235 |
| 2017/0004118 A1* | 1/2017 | Broomhall | G06T 11/001 |

* cited by examiner

Before Algorithm is Applied:

FIG. 3A

Video Presentation Generated with One Video Clip:

FIG. 3B

Video Presentation Generated with Two Video Clips:

Hi Mr. Jones, This is Mr. Smith from ABC Company. I was just reading about your earnings announcement and growth of your cloud products. Since XYZ Company is innovating in similar spaces as our other customers, I wanted to contact you.
We're helping many companies reactivate stalled pipelines by giving their salespeople the ability to create high quality, personalized video messages for prospects. ABC Company is achieving incredible response rates from prospects that are not replying to phone calls, emails, or Linkedin messages.
Leading companies have instructed their sales team to use our software to make high quality, personalized videos in seconds on their mobile devices, complete with demo footage, graphics, and more—and they're rescuing as much as 20% of previously stalled or closed/lost pipeline.
Mr. Jones, think of your average sale representative's quota—how much of that forecast constitutes deals gone dark, and what if you could recoup that extra 20% without adding new leads? Let's setup a quick call to see if we can help, would next Tuesday at 2:00 p.m. work for you?

FIG. 5

SYSTEMS AND METHODS FOR GENERATING AUDIO OR VIDEO PRESENTATION HEAT MAPS

CROSS-REFERENCE TO RELATED APPLICATIONS

This application is a continuation of U.S. patent application Ser. No. 15/984,049, filed on May 18, 2018, which claims the benefit of U.S. Provisional Patent Application No. 62/644,113, filed on Mar. 16, 2018. The entire contents of these applications are incorporated herein by reference.

BACKGROUND OF THE INVENTION

Millions of video cameras and computer and photo devices that record video are sold worldwide each year in both the professional and consumer markets. Those cameras and devices are used to record an untold amount of video each year. Editing the video is one of the most important steps in transforming the recorded raw visuals into valuable, concise, engaging, and/or coherent content.

Corporations and other organizations spend significant time and resources to create videos used, for example, to market the company or its products, or to recruit potential hires for employment opportunities. The videos may include, for example, footage of employees engaged in work at the company, interviews of employees describing their experience at the company, or products the company offers for sale.

In the professional video-production market, billions of dollars, significant time, and other resources are spent editing video—taking raw footage shot with video cameras and devices, loading it into video editing software platforms, reviewing the footage to find the most compelling portions, and assembling the compelling portions in a fashion that communicates or illustrates the requisite message or story in a focused, engaging way. The editing process may also include adding professional footage transitions, soundtrack layers, and effects to enhance the video. But considering the time, money, and expertise often invested to edit video to a professional level or compelling presentation level, the video editing process can be a daunting task for the average consumer. Even for the video editing professional, it is not uncommon for a high quality video production workflow to take 30 times longer than the finished video time. For example, a finished two-minute video can take 75 minutes to edit using traditional video editing software. Beyond the significant time investment, the average consumer does not have the necessary technical skill required to proficiently use video editing software, or the advanced shot sequencing, enhancing, and combining expertise acquired by professional producers at great cost.

For these reasons, the average consumer typically does not have the resources to transform the raw footage he or she films into professional grade video presentations. Creating documentary-grade video stories, complete with narration and overlaid support footage, and edited into concise presentations, is out of reach for most people. Consumers often instead settle for overly long collections of un-edited, aimless video clips that are dull to watch due to their rambling nature, at best using consumer software to add color or visual overlays to dress up the video footage. In the alternative, when consumers hire professional video editors for events such as weddings, birthdays, or family sports events, they typically must spend significant funds to do so.

Video can also be used as part of a company's direct sales plan. Most salespersons deliver messages in analogue ways, for example in conversations at customer offices or by phone. Because of the inherent variability in message delivery by each salesperson and the lack of feedback to measure delivery, when a company develops a preferred message for salespersons to deliver, it is often difficult to determine if, in fact, the salespersons are delivering the proper messages, and whether the messages are viewed by customers.

Each salesperson may individually record an audio or video presentation based on messages provided by the company, and deliver the message to each of the salesperson's customers or clients. But choosing an effective and compelling message, especially when selling products, is critical for success. And measuring the effectiveness of presentations can be difficult.

There is a need for methods and apparatuses that are easy to use, configure, and/or adapt to facilitate, transform, and automate the process of creating, enhancing, and editing videos. Such methods and apparatuses would increase the effectiveness, efficiency and user satisfaction by producing polished, enhanced video content, thereby opening up the proven, powerful communication and documentation power of professionally edited video to a much wider group of business and personal applications. There is also a need for methods and systems to measure whether certain audio or video messages are delivered, and the extent to which those messages are played by the intended audience.

BRIEF DESCRIPTION OF THE DRAWINGS

A further understanding of the invention can be obtained by reference to embodiments set forth in the illustrations of the accompanying drawings. Although the illustrated embodiments are merely exemplary of systems, methods, and apparatuses for carrying out the invention, both the organization and method of operation of the invention, in general, together with further objectives and advantages thereof, may be more easily understood by reference to the drawings and the following description.

Also, the drawings are not intended to limit the scope of this invention, which is set forth with particularity in the claims as appended hereto or as subsequently amended, but merely to clarify and exemplify the invention.

DETAILED DESCRIPTION

The invention may be understood more readily by reference to the following detailed descriptions of embodiments of the invention. However, techniques, systems, and operating structures in accordance with the invention may be embodied in a wide variety of forms and modes, some of which may be quite different from those in the disclosed embodiments. Also, the features and elements disclosed herein may be combined to form various combinations without exclusivity, unless expressly stated otherwise. Consequently, the specific structural and functional details disclosed herein are merely representative. Yet, in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Reference is made in detail to embodiments, examples of which are illustrated in the accompanying drawings. In the following schematic, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Figure 1:
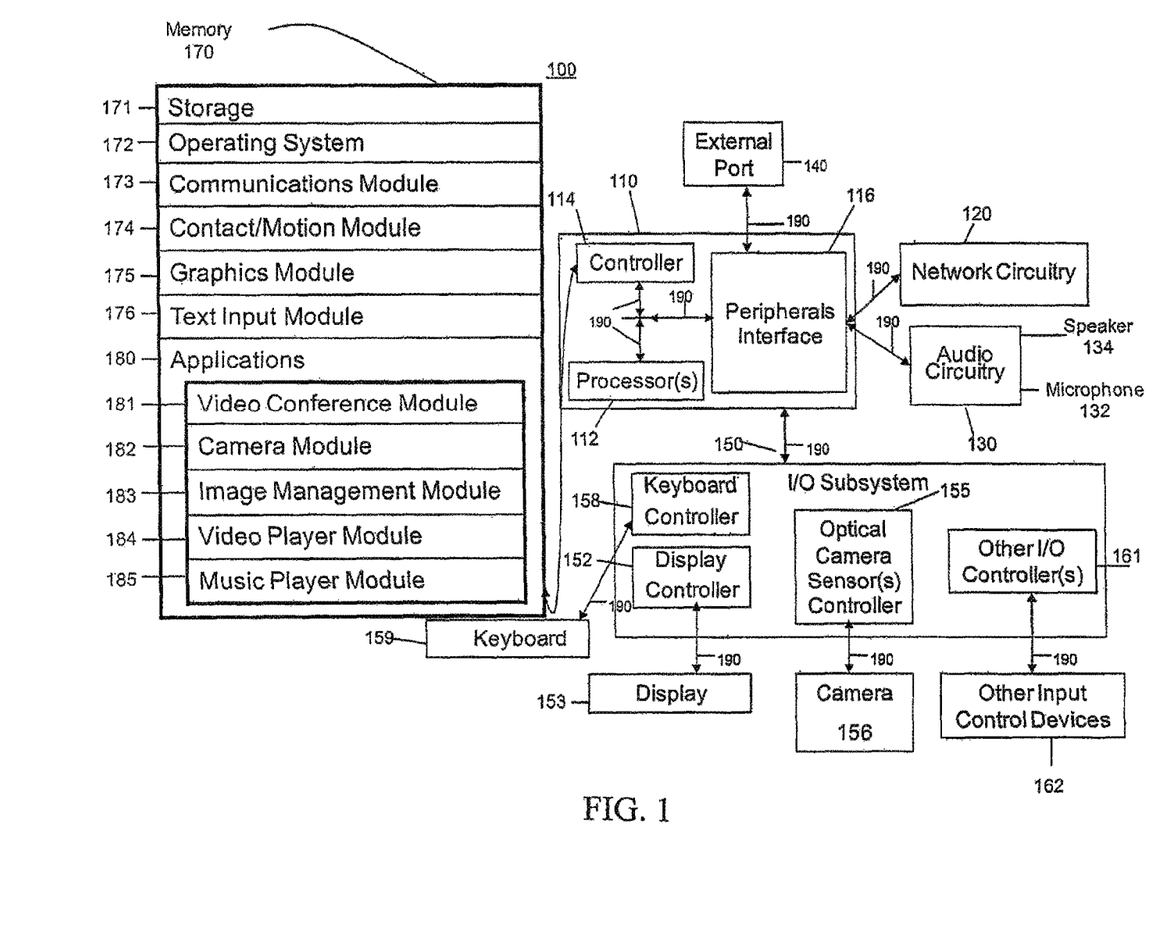
FIG. 1 is a schematic diagram of an illustrative computing device used in the practice of the invention.

FIG. 1 is a schematic diagram of a computing device 100 that may be used in the practice of the invention. Device 100 comprises a processing unit 110, network interface circuitry 120, audio circuitry 130, external port 140, an I/O video clip system 150 and a memory 170. Processing unit comprises one or more processors 112, a memory controller 114, and a peripherals interface 116, connected by a bus 190. I/O subsystem includes a display controller 152 and a display 153, one or more camera controllers 155 and associated camera(s) 156, a keyboard controller 158 and keyboard 159, and one or more other I/O controllers 161 and associated I/O devices 162. Memory 170 provides general purpose storage 171 for device 100 as well as storage for software for operating the device such as an operating system 172, a communication module 173, a contact/motion module 174, a graphics module 175, a text input module 176, and various application programs 180. The applications programs may include a video conference module 182, a camera module 183, an image management module 184, a video player module 185 and a music player module 186.

The network interface circuitry 120 communicates with communications networks via electromagnetic signals. Network circuitry 120 may include well-known communication circuitry including but not limited to an antenna system, a network transceiver, one or more amplifiers, a tuner, one or more oscillators, a digital signal processor, a CODEC chipset, a subscriber identity module (SIM) card, memory, and so forth. Network circuitry 120 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11 g and/or IEEE 802.11n), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 130, including a microphone 132 and a speaker 134, provides an audio interface between a user and the device 100. The audio circuitry 130 receives digital audio data from the peripherals interface 116, converts the digital audio data to an analog electrical signal, and transmits the electrical signal to the speaker 134. The speaker 134 converts the analog electrical signal to human-audible sound waves. The audio circuitry 130 also receives analog electrical signals converted by the microphone 132 from sound waves and converts the analog electrical signal to digital audio data that is transmitted to the peripherals interface 116 for processing. Digital audio data may be retrieved from and/or transmitted to memory 170 and/or the network interface circuitry 120 by the peripherals interface 116. In some embodiments, the audio circuitry 130 also includes a USB audio jack. The USB audio jack provides an interface between the audio circuitry 130 and removable audio input/output peripherals, such as output-only headphones or a microphone.

The I/O subsystem 150 couples input/output peripherals on the device 100, such as display 153, camera 156, keyboard 159 and other input/output devices 162, to the peripherals interface 116. Advantageously, display 153, camera 156, microphone 132, and speaker 134 may all be part of a cell-phone such as an iPhone or similar smartphone. Display 153 may be a touch screen device. As is known in the art, a touch screen display is able to sense when and where its display screen is touched or tapped and correlate the touching with what is displayed at that time and location to derive an input. The I/O subsystem 150 may include a display controller 152, a camera controller 155, a keyboard controller 158, and one or more other input/output controllers 161 for other input or output devices. The one or more other I/O controllers 161 receive/send electrical signals from/to other input/output devices 162. The other input/control devices 162 may include physical buttons (e.g., push buttons, rocker buttons, etc.), dials, slider switches, joysticks, click wheels, track balls, and so forth. In some alternate embodiments, I/O controller(s) 161 may be coupled to any (or none) of the following: an infrared port, USB port, and a pointer device such as a mouse. The one or more buttons may include an up/down button for volume control of the speaker 134 and/or the microphone 132.

The device 100 may also include one or more video cameras 156. Illustratively, the video camera may include charge-coupled device (CCD) or complementary metal-oxide semiconductor (CMOS) phototransistors. The video camera may receive light from the environment, projected through one or more lens, and convert the light to data representing an image. In conjunction with an imaging module, the video camera may be embedded within the computing device, and in some embodiments, the video camera can be mounted in a separate camera housing for both video conferencing and still and/or video image acquisition.

Memory 170 may include high-speed random access memory and may also include non-volatile memory, such as one or more magnetic disk storage devices, flash memory devices, or other non-volatile solid-state memory devices. Memory 170 may be implemented in one or more physical units. Access to memory 170 by other components of the device 100, such as the processor(s) 112 and the peripherals interface 116, may be controlled by the memory controller 114.

The operating system 172 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 173 facilitates communication with other devices over one or more external ports 140 and also includes various software components for handling data received by or transmitted from the network interface circuitry 120.

The graphics module 175 includes various known software components for rendering and displaying the GUI, including components for changing the intensity of graphics that are displayed. As used herein, the term "graphics" includes any object that can be displayed to a user, including without limitation text, icons (such as user-interface objects including soft keys), digital images, videos, animations and the like.

In conjunction with keyboard 159, display controller 152, camera(s) 156, camera controller 155, microphone 132, and graphics module 175, the camera module 183 may be used to capture still images or video (including a video stream) and store them in memory 170, modify characteristics of a still image or video, or delete a still image or video from memory 170. Embodiments of user interfaces and associated processes using camera(s) 156 are described further below.

In conjunction with keyboard 159, display controller 152, display 153, graphics module 175, audio circuitry 130, and speaker 134, the video player module 185 may be used to display, present or otherwise play back videos (on an external, connected display via external port 140 or an internal display). Embodiments of user interfaces and associated processes using video player module 185 are described further below.

It should be appreciated that the device 100 is only one example of a multifunction device, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

In some embodiments, the peripherals interface 116, the CPU 112, and the memory controller 114 may be implemented on a single integrated circuit chip. In some other embodiments, they may be implemented on separate chips.

As set forth above, software for controlling the operation of device 100 is stored in memory 170. In accordance with the invention, the software includes instructions that when executed by processor(s) 112 cause device 100 to edit video files stored in memory 170 to produce a finished video presentation.

Figure 2:
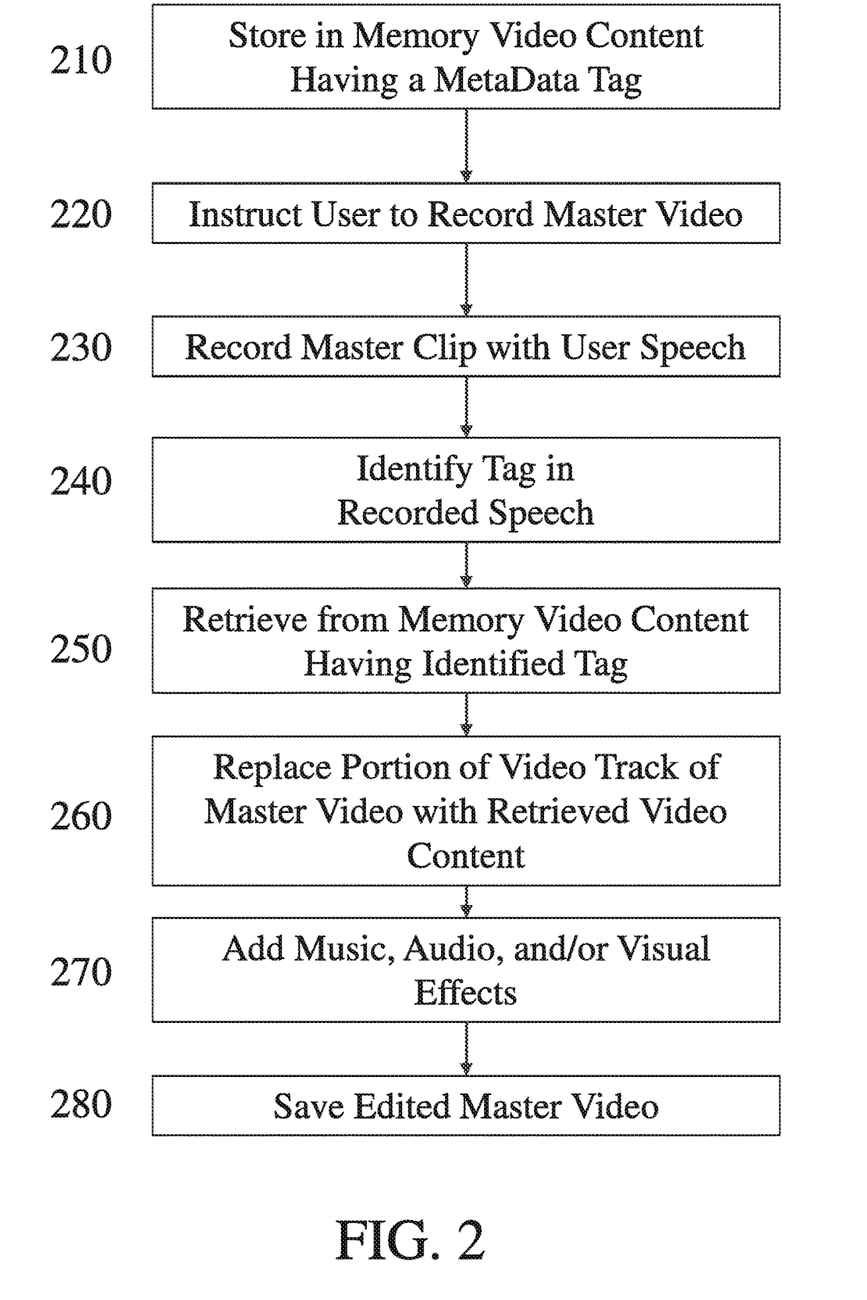
FIG. 2 is a flowchart depicting several steps in an illustrative embodiment of the method of the invention.

FIG. 2 is a flowchart depicting the steps performed by the software of device 100 in an illustrative embodiment of the invention. At Step 210, video content including one or more video files may be stored in memory (170). "Video content" or "video file" as those term are used herein is meant to be broadly interpreted to include any type recorded video (with or without recorded audio), one or more digital photographs, a collage of photographs, a presentation slide, or any other visual medium. For example, video content may be animated photos comprising a plurality of photos that are transformed into a video clip by reusing pixels from the photos in successive frames with a visual transformation (such as zooming in on the photo).

Each video file stored in memory (170) may have associated metadata, including one or more tags. One or more tags may relate to the subject of the video in the video file, the location where the video file was recorded or created, or any other information relating to the video. Tagging of the video content may be performed manually, or automatically using computer vision and machine learning software that may recognize objects and landmarks in images and auto tag them. The one or more tags may be associated with the video file before the video content is stored in memory (170), while the video content is stored in memory (170), or after the video content is stored in memory (170).

At Step 220, the software generates an instruction to the user to record a master video. Again, device 100 can present this instruction visually by display 153 or audibly by speaker 134.

At Step 230, the user records a master video. The master video, including a video track and an audio track, is recorded using camera 156 and microphone 132 operating under software instructions running on one of the processors. During recording of the master video, the display 153 may show the video as it is being recorded. As the master video is being recorded, at Step 240, speech recognition software stored on the device may monitor the words being spoken by the user and recorded as part of the master video.

At Step 250, if a word or phrase spoken by the user matches a tag of a video file, or in the alternative if a word or phrase spoken by the user is similar to or related to a tag of a video file, the software may retrieve from memory video content having a tag corresponding to that spoken word. For example, if the user is recording a video during a visit to San Francisco and stored on the device is a digital photograph of the Golden Gate Bridge, then when the user mentions the phrase "Golden Gate Bridge" while recording the master video, the software may retrieve from memory the digital photograph of the Golden Gate Bridge. The software may then display the video content, in this example the image of the Golden Gate Bridge, or a thumb-nail image of the video content on display 153.

A first digital colored frame may be depicted adjacent to the border of the display 153 to indicate that the final presentation will depict the master video during the time that the frame is displayed. The first frame may be black, white, or any color. At the time that a video clip is to be depicted in the final presentation, the first frame may be removed and a second frame may be displayed around the thumb-nail image of the video clip. The second frame may also be black, white, or any color, including a different color than the first frame. Each frame may fade, be erased linearly or otherwise may be gradually removed to indicate that time until the display of video track of the video file will end. Device 100 may also display during recording of the master video, starting at the time that the video track of a video clip would be inserted, a countdown timer indicating the time remaining before the end of the video content.

In the alternative, while the master video is recorded, the device may not display video content retrieved from memory video. Instead, video content having a tag corresponding to a word or phrase spoken by the user while recording the master video may be only selected by the software. Regardless of whether retrieved video content is displayed during recording of the master video, the software saves data concerning the locations in the master video where the word or phrase corresponding to a tag of a video file was spoken.

To the extent that the video content has a time duration, such as a short recorded film, Immediately after the master video is recorded, device 100 may automatically truncate the video content using a pre-specified algorithm that is implemented in software. In one embodiment, the video content may be truncated to a predetermined duration.

At Step 260 device 100 automatically replaces one or more portions of the video track of the master video with the video track(s)—or the truncated video tracks if truncating is performed—of the video files. In this context, "inserted" means replacing a portion of the video track of the master video with the video track of the video file. The software may create a video presentation that comprises a first portion of the video track of the master video, followed by the video track of the video file, followed by an end portion of the video track of the master video.

In the example embodiments described above, the audio track of the final presentation may comprise solely the audio track of the master video. In the alternative, at Step 270, the software generates an invitation to the user to select music to add as an additional audio track or to replace the audio track of the master video. At Step 280 audio effects such as the selected music track and visual effects such as fades and dissolves may be automatically added by the software to the master video and truncated video clips to produce the finished video presentation.

In other embodiments, the user can specify the length of the finished video presentation; the software can automatically add a pre-selected graphic to the beginning and/or ending of the finished video presentation; or the software can use a pre-loaded table to determine the length of the presentation depending on the type of presentation. If a graphic is added at the beginning and/or end of the final video presentation, the software may set the volume of the music to a certain first level when the graphic is displayed, and set the volume of the music to a second level while the video track of the master video and the video file(s) are displayed. For example, the volume of the music at the second level may be lower than the volume at the first level. The software may also overlay any of the videos with text. For example, the software may display the name of the user at the bottom of the master video. The software may prompt the user to enter their name prior to recording the master video. In the alternative, the user may enter their name or any other text at any time prior to recording the master video. In another alternative embodiment, the user may be required to enter login information (e.g. a login name and password) before using the software. The software may then determine the name of the user based on the login information presented, and display the name of the user or other information relating to the user (e.g., the user's email address, phone number, corporate title) in the master video.

In some embodiments, the user records only an audio track, so only video content is displayed in the final video composition. In another embodiment, instead of recording a master video or an audio track, the user may select a pre-recorded master video or a prerecorded audio track to be used by the software to create the video presentation.

The software may be preconfigured or configured by the user as to how many or a maximum number of video files will be in the finished video presentation that is produced in a particular editing assignment. Thus, in some embodiments of the invention, the user is offered no choice in the number of video files; and the software utilizes up to a preconfigured number of video files. In other embodiments, when the software is activated, the user is invited to specify how many video files he would like in the finished video presentation.

Illustratively, device 100 presents on display 153 a message asking the user how many video files he would like to use. The user may respond by entering a number via keyboard 159 or by selecting a number on the display. Alternatively, the user may be queried by a voice message using speaker 134, and the user may respond with a spoken number.

In an alternative embodiment, rather than request a number of video files from the user, device 100 may ask the user to specify what type of video presentation is to be produced. The software may then determine from a look-up table the number or maximum number of video files to be used with that type of presentation. In some embodiments, the user may be given the option to alter the number determined from the look-up table. Where the user is asked to specify the type of video presentation, device 100 may present on display 153 a list of types of video presentations and requests the user to select one of the types.

Figure 3A:
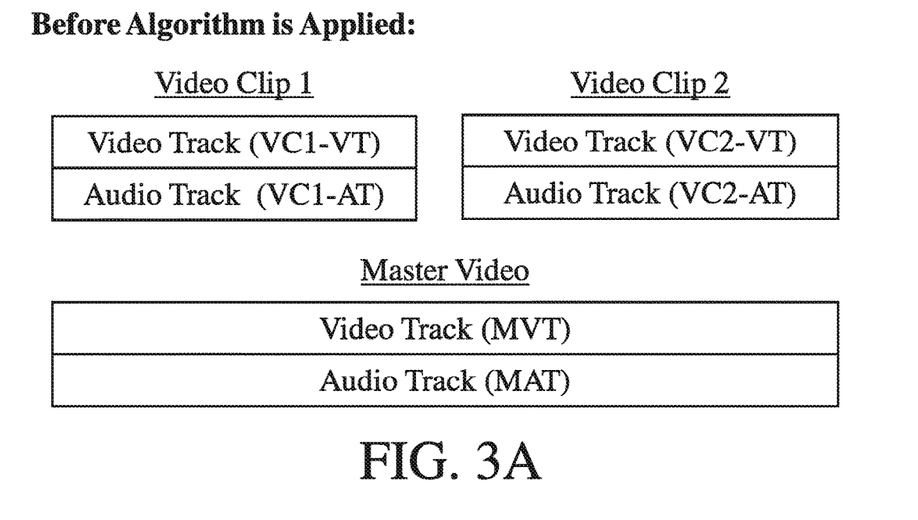
FIGS. 3A-3C are schematic diagrams depicting the application of an illustrative embodiment of an automatic video editing algorithm to a master video and video clips in an illustrative embodiment of the invention.
Figure 3B:
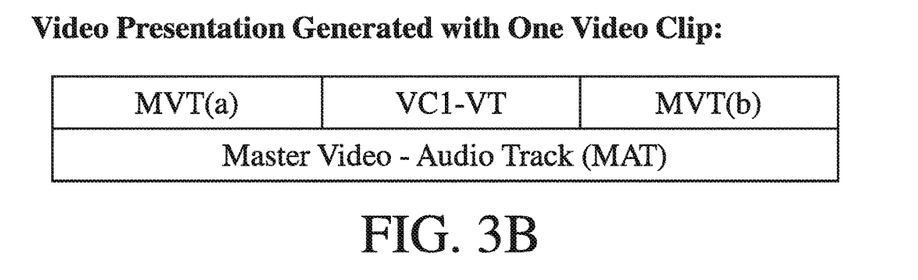
Figure 3C:
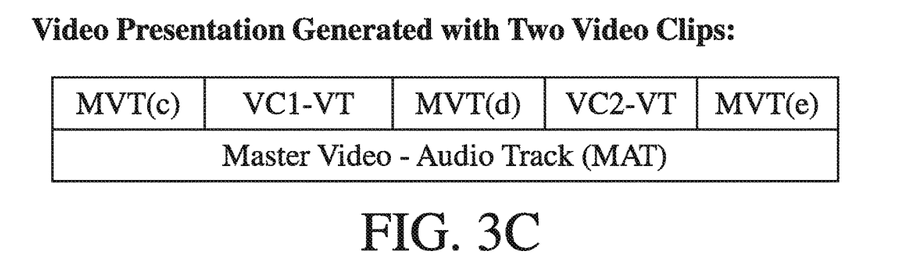

FIGS. 3A-3C are schematic diagrams illustrating the video editing algorithm of FIG. 2. FIG. 3A depicts video files Video Clip 1 and Video Clip 2, each having an audio track (VC1-AT and VC2-AT, respectively) and a video track (VC1-VT and VC2-VT, respectively). The master video is also depicted as having an audio track (MAT) and a video track (MVT).

FIG. 3B depicts a final presentation compiled by the software when one video file is inserted. The first portion of the video track of the master video (MVT(a)) and the last portion of the video track of the master video (MVT(b)) are retained. The middle portion of the video track of the master video is replaced with the video track of Video Clip 1 (VC1-VT). The audio track of the master video may be used for the duration of the final presentation.

FIG. 3C depicts a final presentation compiled by the software when two video files are inserted. The first portion of the video track of the master video (MVT(c)), a middle portion of the video track of the master video (MVT(d)), and the last portion of the video track of the master video (MVT(e)) are retained. Two portions of the video track of the master video are replaced with the video track of Video Clip 1 (VC1-VT) and the video track of Video Clip 2 (VC2-VT), respectively. The audio track of the master video is used for the duration of the final presentation. In the alternative, the video track of Video Clip 2 may be inserted immediately after the video track of Video Clip 1. In that embodiment, only a first portion and a last portion of the video track of the master video would be maintained. The final presentation would depict a first portion of the master video, the video track of Video Clip 1, the video track of Video Clip 2, and the last portion of the master video. The audio track of the master video may be used for the duration of the final presentation.

By combining the tagged video files selected based on recorded words or phrases, the device directed master clip, and the automatic editing algorithms, the finished video presentation can be automatically assembled without further user input in a machine based transformation much faster than with traditional manual video editing software.

Figure 4:
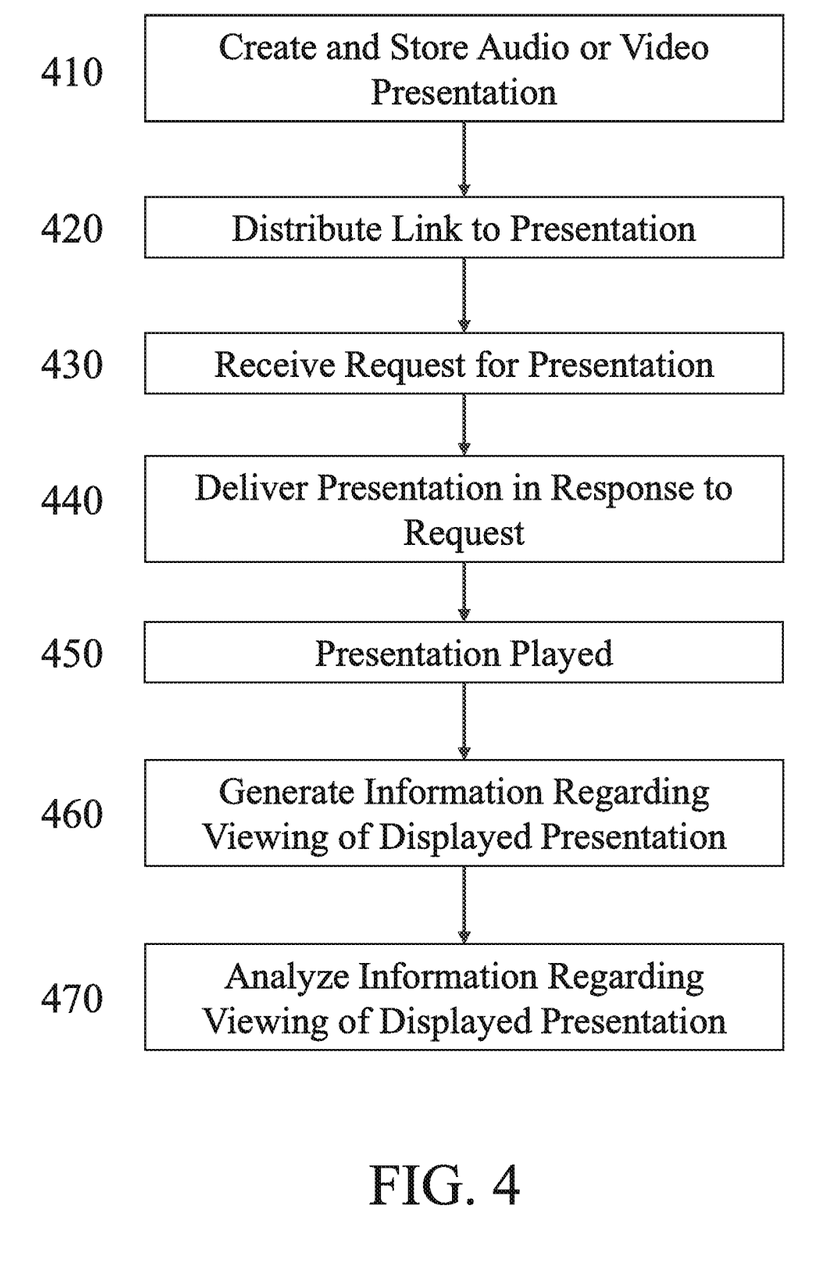
FIG. 4 is a flowchart depicting several steps in an illustrative embodiment of the method of the invention.

FIG. 4 is a flowchart depicting the steps of an exemplary method for generating and determining the effectiveness of a presentation. A computer system, an electronic device, or a plurality of electronic devices may be used to perform some or all of the steps. At Step 410 a presentation is created. The presentation may be an audio presentation or a video presentation. The term "video presentation" as used herein includes presentations that have audio content, such as an audio track. A video presentation may be created using any number of devices, systems, or methods. Example devices, systems, and methods are described above. Other example systems, devices, and methods for creating video presentations are disclosed in U.S. Pat. No. 8,737,815 and U.S. Patent Publication No. 2018/0061455, which are incorporated herein by reference.

In the exemplary case of salespersons of a company or other organization creating presentations to be sent to clients or prospective clients, each salesperson may create and store their own audio presentation or video presentation. To standardize the messaging presented by the salespersons and/or to facilitate analysis of the delivery of the presentations, each audio presentation or the audio content of each video presentation may be based on a script which each salesperson may read while recording the presentation. The script may be provided, for example, by the salespersons' employer. A script may provide some uniformity to the presentations, but the presentations may not be perfectly synchronized. For example, even if each salesperson records the same words, each salesperson may speak at a different speed, resulting in a presentation that may be longer or shorter than the average length presentation. Also, each salesperson may personalize presentations by recording a unique presentation for each intended recipient, and the salesperson may address the recipient, for example by name, in the presentation. Each salesperson may also end the presentation in a different way by, for example, suggesting a time to meet, a time to talk on the phone, or a request that the intended recipient contact the salesperson. However, the use of a script is intended to ensure that at least the recorded words of a presentation are substantially the same as the script, and/or that the recorded words of a plurality of presentations by multiple salespersons are substantially the same as each other. If at least 75% or at least 80% or at least 85% or at least 90% or at least 95% or at least 97% or at least 99% or 100% of the recorded words between two or more presentations are identical, then the recorded words may be considered substantially the same.

Recorded presentations may be stored on one or more computer storage media, such as memory of a computer and/or server. A processor of the computer, server, or other device may determine and/or control the location of the computer storage medium in which each presentation is stored.

At Step 420, each recorded presentation may be delivered to, for example, a client or prospective client. The presentation may be delivered by transmitting a link to the stored presentation. For example, a link to the stored video presentation, or to a webpage where the presentation may be played, may be transmitted by including the link in an electronic mail message, a text message, or other messaging software, that is sent to an intended recipient via the Internet. The link may be, for example, contained within HTML code. Also, if HTML code containing the link is displayed within the email, the link may be concealed under, for example, a clickable static image or a GIF that may show one or more portions of the presentation. The message may, but need not, include content other than the link, such as an introduction from the sender of the message, a description of the presentation, and/or instructions for accessing the presentation by selecting the link.

A single presentation may also be sent to multiple recipients. A link may be included in multiple messages, wherein each message is transmitted to a single recipient. In addition, or in the alternative, a message containing a link to the presentations may be transmitted to multiple recipients.

A message containing the link may be accessed, for example, by opening the message in a program on an electronic device, such as a desktop computer, laptop computer, tablet, smart phone, or other device. The message may be viewed, for example, within its own window on the device display screen, may encompass the entire display screen, or may be viewed in a sub-window within an application, such as an email application. The link may be selected by clicking on the link with a computer mouse, touching the link on a touch-sensitive display screen, or by any other computer input device or method.

In the alternative, the presentation may be delivered with the message, without a link to the presentation. The presentation may be included as an attachment to the message. A presentation attached to a message may be opened by selecting (e.g. double clicking with a mouse pointer) an icon corresponding to the presentation. In addition or in the alternative, the presentation may play within the message widow in response to the message being accessed, without any further input from the recipient of the message. Software included with the message may play the presentation when the message is accessed. A presentation played within a message window may be, for example, attached to the message, or may be streamed from a remote computer storage medium where the presentation is stored.

If the message is sent with a link that may be used to access the presentation, at Step 430, in response to selection of the link, a signal may be transmitted from the device on which the link is selected. The signal may include a request for the presentation associated with the link. The signal may be received by the processor that stored the presentation, or by another processor that may be in communication with the computer storage medium where the presentation is stored.

At Step 440, a processor that receives the signal may transmit the presentation or cause the presentation to be transmitted by another processor from the storage medium in which it was saved. The presentation may be transmitted to the device that transmitted the signal requesting the presentation, and/or the presentation may be transmitted to another device. The presentation may be transmitted by streaming the presentation, or by transmitting the entire presentation or part of the presentation as a file.

In addition, software may be transmitted to the device when the presentation is transmitted. The software may be used to play the presentation and/or monitor playing of the presentation as further discussed below. Software used to play the presentation may cause the presentation to be played within a window used to view the message and/or in a separate window. In addition or in the alternative, software used to play or monitor playing of the presentation may be transmitted with the message containing the link, for example, as an attachment to the message or embedded within the message.

At Step 450, the presentation may be played on a device, such as the device on which the message was viewed and the link was selected. If the presentation is a video presentation, playing the presentation may include displaying a video portion of the presentation on, for example, a computer display screen, or a smartphone or tablet screen. The presentation may be played within a webpage of an internet web browser. For example, the presentation may be downloaded to the cache of a web browser. As another example, selecting the link may cause a video player application to launch and play the presentation. In addition or in the alternative, playing the presentation may include playing an audio portion of the presentation from speakers connected to or incorporated into the device.

When the presentation is received by a device, the presentation may be played without any additional user input to the device. In the alternative, when the presentation is received by a device, the device may provide an indication, such as a sound, a light, or a graphical user interface element on the display of the device, that the presentation has been received and/or that the presentation may be played on the device. If such an indication is provided, a user of the device may provide an input to the device to request that the presentation be played, and the device may play the presentation in response thereto.

At Step 460, while the presentation is played on the device, software stored on a computer storage medium remote from the device, and/or software transmitted to the device and/or software stored on the device may be used to monitor, record, and/or save information concerning playback of the presentation, such as the duration of time that the presentation is played, which portions of the presentation are played, how many times the presentation is played or begins playing, and/or which portions of the presentation, if any, are played multiple times and the number of times each of those portions is played. For example, if the presentation is played within a web browser, the web browser and/or software contained within the web page may determine, for example at periodic intervals (e.g. every second), the time location within the presentation that is played. To the extent that information concerning playback of the presentation is monitored and/or recorded by software stored on the device, the software may transmit the information concerning playback to another device, server, or system for processing. For example, the information may be transmitted to the computer or server on which the presentation was stored at Step 410.

The software may record or be provided the total length of time for which the presentation was recorded (Tt), and playback information such as the total number of times that the presentation is played on the device from the beginning to the end of the presentation (Nt)—which may including the number of times that the presentation is paused one or more times but each time resumed without closing the presentation—and for each time that the presentation is played from the beginning but stopped and closed before reaching the end, the duration of time that the presentation was played (Ts).

At Step 470, playback information concerning playing of one or more presentations may be combined, analyzed, and/or reported. In addition or in the alternative, software may be used to determine and/or provide a report of the number of times a presentation was played but terminated before end of the presentation (Ns), and the duration that the presentation was played each time (Ts). For example, the software may report that the first 50% of a presentation was played four times and the first 25% of the presentation was played three times.

If the audio content constitutes spoken words, software which may include speech recognition software may be used to provide a further detailed analysis of the extent to which a presentation was played. For example, software used to analyze the playback information may determine the extent to which a presentation was played from the beginning of the presentation to a particular character, syllable, word, phrase, or sentence in the presentation. For example, the software may be used to compare the duration of time for which a presentation is played (Ts) each time it is played, with the timed location within the presentation corresponding to when a particular character, syllable, word, phrase, or sentence is said. The software may then be used to determine the number and/or percent of times that the presentation was played from the beginning to that character, syllable, word, phrase, or sentence.

Speech recognition software may be used to improve analysis of the playback information, including when multiple presentations are analyzed. Specifically, based on playback data concerning the time at which a presentation was stopped, speech recognition software may read the presentation up until that point and determine the words that were played and/or the last word that was played before the presentation was stopped. Alternatively, a particular word, phrase, or sentence may be input to speech recognition software, and the speech recognition software may determine the location(s) within a presentation corresponding to when a particular word, phrase, or sentence was recorded. If multiple presentation are analyzed together, that determination may be used to assess the number and/or percent of times that the presentations were played from the beginning to a particular word, phrase, or sentence without having to determine where within each presentation the word, phrase, or sentence was spoken.

If the audio content of the presentation is predetermined or otherwise known at the time of analysis because, for example, the audio content constitutes recorded words read from a script, a more detailed analysis may be made. The script may be saved as a digital file, such as a text file or a Microsoft Word document. As explained above, software can be used to determine the percentage of a presentation that is played before it is stopped (Tp) (e.g., 50% of the presentation). As discussed further below, that percentage can be combined with the script to create a "heat map" depicting the words that were played before the presentation was stopped.

In the alternative, speech recognition software may be used to first identify the word, phrases, and/or sentences spoken within a presentation, or a plurality of presentations each with substantially the same words. For each presentation, a script input to the speech recognition software may be used to correct misidentified words. Then a record may be made of what time from the beginning of each presentation each of the words, phrases, or sentences recorded for the presentation is spoken. Playback information concerning the time each presentation was stopped (Ts) may then be used to reference that record to determine up to which word, phrase, and/or sentence was played.

The number of characters, syllables, and/or words recorded for a presentation may also be used to determine the extent to which the presentation was played. The total number of characters (Ct), syllables (St), and/or words (Wt) of a presentation may be counted by speech recognition software. In addition or in the alternative, the total number of characters (Ct), syllables (St), and/or words (Wt) of a presentation, may be determined from a character or word count function of, for example, a word processing program, based on a digital file containing the text of the words spoken during the presentation (e.g., a script provided by a salespersons' employer). Software may be used to divide playback data indicating the time at which a presentation was stopped (Ts) by the total length of the presentation (Tt) to determine the percentage of the presentation that was played (Tp). The percentage of the presentation that was played (Tp) may be multiplied by the total number of characters (Ct), the total number of syllables (St), and/or the total number of words (Wt) spoken during the presentation to determine the last character (Cs), syllable (Ss) and/or word (Ws) within the presentation approximately where the presentation was stopped (e.g., $Cs=Tp\times Ct$; $Ss=Tp\times St$; $Ws=Tp\times Wt$).

As a specific example, a presentation may include words having 300 characters (Ct), and the total length of the presentation may be five minutes (Tt). If playback of the presentation is stopped two minutes (Ts) after starting the presentation, software may be used to calculate that the percentage of the presentation that was played ($Tp=Ts/Tt$) was 40%, and the presentation was stopped at approximately character 120 ($Cs=Tp\times Ct$).

Speech recognition software may be used to determine, while the presentation is playing, the last word played when a presentation is stopped, particularly when the presentation is stopped before the end of the presentation. Speech recognition software on the device on which the presentation is played, and/or speech recognition software stored on the device or system from which the presentation is streamed, may monitor playback of the presentation as it is played and determine the last word played up until the time that the presentation is stopped, and/or the number of characters, syllables, and/or words that are played up until the time that the presentation is stopped.

Software may also be used to report and/or display data and/or other information concerning the extent to which a presentation or a plurality of presentations are played. For example, software may be used to display a heat map showing the characters or words (i.e. text) of a presentation and a graphic representation of the extent to which a portion or portions of the text were included in the presentation containing the text were played. A heat map generated in accordance with the present invention may depict information concerning a single presentation which may have been viewed one time by one viewer, multiple times by one viewer, one time each by multiple viewers, or one or more times by multiple viewers. In the alternative, a heat map generated in accordance with the present invention may depict information concerning a plurality of presentations, wherein each presentation may have been viewed one time by one viewer, multiple times by one viewer, one time each by multiple viewers, or one or more times by multiple viewers. To the extent that a heat map is generated from information collected from more than one presentation playback, the information depicted in the heat map may reflect an average of data calculated for each playback.

Figure 5:
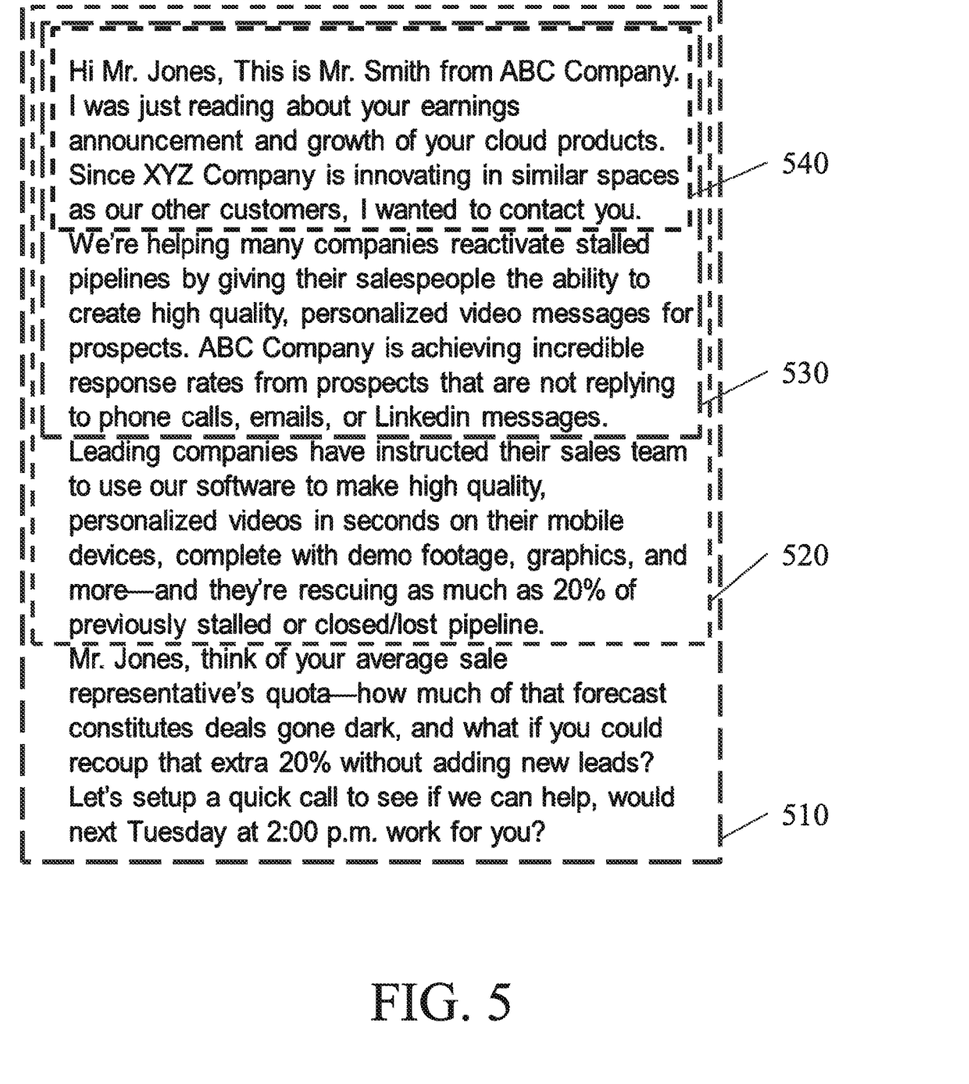
FIG. 5 depicts a display of an exemplary text heat map.

FIG. 5 depicts a display of an exemplary text heat map. The words of the heat map may be a script that was read when the presentation was recorded. A digital file containing the words of the script may be loaded or opened within the software used to generate a text heat map. In the alternative, speech recognition software may generate the words of a heat map from the audio portion of a presentation.

Overlaid on the text depicted in FIG. 5 are boxes enclosing different percentages of the text. For example, Box (510) surrounds the entire text and represents playback of 100% of the words of the presentation. Boxes (520, 530, 540) surround smaller portions of the text and correspond to smaller percentages of times for which the presentation to was played. For example, box (520) may enclose 75% of the text, box (530) may enclose 50% of the text, and box (540) may enclose 25% of the text. A legend or other indication may be used to convey the percentage that each box represents. If a presentation is played multiple times, either on the same device or on multiple devices, playback information identifying the percent of the presentation played each time it is played may be mapped to the text and used to show the extent to which the words of the text were played.

As an example, if a presentation is played 10 times, five of those times (50%) the entire presentation may be played, three of those times (30%) only the first 25% of the presentation may be played, and two of those times (20%), only 50% of the presentation may be played. In that example, software used to analyze the playback information may report that the portion of the text enclosed by box (510) was played 50% of the time, the portion of the text enclosed by box (530) was played 20% of the time, and the portion of the text enclosed by box (540) was played 30% of the time.

Other graphical indicators and/or elements may be used to convey playback information using a heat map. For example, colors, a color gradient, and/or a gray gradient may be used instead of boxes to delineate between portions of the text that were played. For example, the portion of the text surrounded by box (540) may be highlighted with a light blue color, the portion of the text surrounded by box (530) may be highlighted with a darker blue color, and so on.

To the extent that the number of characters and/or syllables recorded for a presentation are used to determine the extent to which a presentation was played, the identified last character and/or syllable played may be a character or syllable that is not at the end of a word. Referring to the text in FIG. 5 as an example, software used to determine the extent to which a presentation was played might identity the letter "g" in the word "messages" at the end of box (530) as the last letter played. Software used to display the heat map may be configured "round up," i.e., have each graphical element showing the extent to which a presentation was played (e.g. box (530)) include the entire word containing the last played letter or syllable. In the alternative, software used to display the heat map may be configured "round down," i.e., have each graphical element showing the extent to which a presentation was played include only the last full word played. In the example given above, if software is configured to "round down," and the letter "g" in the word "messages" at the end of box (530) is determined to be the last letter of a presentation played, the word "messages" would not be indicated as played.

In the alternative, one or more color and/or gray scale gradients may be used to account for an approximate determination of the last character, syllable or word played. For example, for two adjacent highlighted portions of text on a heat map, the highlight color of one portion may fade into the highlight color of the adjacent portion. In the alternative, for two adjacent portions of colored text on a heat map, the font color of one portion may fade into the font color of the adjacent portion.

For a video presentation, the heat map may also include images corresponding to the visual elements of a presentation at one or more portions of the presentation. For example, one or more title graphics may be presented at the start and/or end of the video presentation. The title graphics may display information such as a company name, the name of the person who recorded the presentation, the date that the presentation is recorded or transmitted, the title of the presentation, and/or the total run time for the presentation. The heat may map may include one or more images of the title graphics, for example, as thumbnail images. The heat map may also include images from the presentation that may be, for example, screen shots taken at particular parts of the presentation and/or video content as described above. The images may be positioned at one or both sides, at the top, and/or at the bottom of the text of the heat map. To the extent that the images are presented at the side of the heat map, they may be positioned horizontally in line with, or approximately horizontally in line with, the text spoken at the time the image is displayed during the presentation. For example, one or more images may be positioned to the side of the text and in line with the text spoken at the time the image is first displayed.

Without speech recognition software, matching the percentage playback information to the boxes (510, 520, 530, 540) or other graphical elements may yield only an approximation of the extent to which the words of the script were played. By using the percentage of a presentation played as proxy for the percent of the scripted words spoken, the software may not precisely determine which words were in fact played. However, speech recognition software may be used in conjunction with the percentage of a presentation played to determine which words were played. For example, after determining the length of time a presentation is played up until when it is stopped (Ts), speech recognition software can be used to analyze the presentation to determine the portions of the presentation that were played, including the last word that was played. Also, if the audio content of a presentation follows a script, a digital file of the script may be input to the speech recognition software to improve recognition of the words of the presentation.

An example of speech recognition software assisted by words input to the software is disclosed in U.S. Pat. No. 6,018,708. That patent discloses a method for performing speech recognition using a supplementary lexicon of frequently used orthographies. Instead of providing a supplementary lexicon, the script read aloud by the salesperson(s) while creating the video presentation may be input to speech recognition software to improve recognition of the words read aloud. Another example is U.S. Pat. No. 9,218,807.

Speech recognition software may also be used to determine the extent to which the words recorded for a presentation follow a script. For example, speech recognition software may be used to calculate a percentage of words from the presentation that match the script. In addition or in the alternative, speech recognition software can be used to display the text of the presentation, and the differences between the text and script. For example, words included in the presentation but not in the script and/or words included in the script but not in the presentation may be shown with particular fonts or/or graphical element (e.g., underlining, strikethrough, italics, font color, font size, font type, highlighting).

Although the invention is described above using the example of presentations created and distributed by salespersons, the invention is not restricted to that context. Instead, the invention may be used in any context, and is not limited to sales presentations.

Numerous variations may be made in the practice of the invention. Computing device 100 is only illustrative of computing systems and user interfaces that may be used in the practice of the invention. The processing unit(s) 110, memory 170, display 153 and camera(s) 156 may all be enclosed in one casing as in a smartphone or the like; or some or all of these components may be in separate units. If these components are separate, they may all be located near to one another as on a desk-top; or they may be considerable distances apart. For example, the memory, camera and display may be at one location while the processor that controls these components in the practice of the invention may be elsewhere connected by a communication link such as the Internet.

Numerous variations may be practiced in the steps described in FIG. 2. For example, some embodiments may not provide for selection of a music soundtrack for use in the finished video presentation.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. A computer implemented method for generating a playback evaluation of one or more digital media files, comprising:
   storing a first digital media file on a computer storage medium, wherein the first digital media file includes an audio recording comprising a recording of a plurality of spoken words;
   using speech recognition software to determine the plurality of spoken words recorded on the audio recording;
   transmitting the first digital media file to a remote device;
   receiving from the remote device data identifying a duration of time that the first digital media file was played on the remote device;
   using speech recognition software and the data received from the remote device to determine the last word of the audio recording played on the remote device;
   displaying on a computer display the plurality of spoken words on the audio recording; and
   depicting a graphic element on the displayed plurality of spoken words indicating the last word of the audio recording that was played on the remote device.

2. The computer implemented method of claim 1, further comprising receiving a digital file comprising the text of the plurality of spoken words on the audio recording.

3. The computer implemented method of claim 2, further comprising inputting the digital file to the speech recognition software.

4. The computer implemented method of claim 3, further comprising using the digital file to determine the time at which each of the plurality of spoken words recorded on the audio recording is located within the first digital media file.

5. The computer implemented method of claim 4, further comprising using the time at which each of the plurality of spoken words recorded on the audio recording is located within the first digital media file to determine the last word of the audio recording played on the remote device.

6. The computer implemented method of claim 1, wherein the graphic element comprises highlighting applied to a subset of the words displayed on the computer display.

7. The computer implemented method of claim 6, wherein the subset of words displayed on the computer display includes the last word and all the prior spoken words on the audio recording displayed on the computer display.

8. The computer implemented method of claim 1, wherein the speech recognition software is used to determine the plurality of spoken words recorded on the audio recording before the first digital media file is transmitted to the remote device.

9. The computer implemented method of claim 1, wherein the speech recognition software is used to determine the plurality of spoken words recorded on the audio recording after the first digital media file is transmitted to the remote device.

10. A computer implemented method for generating a playback evaluation of one or more digital media files, comprising:
- storing a first digital media file on a computer storage medium, wherein the first digital media file includes an audio recording comprising a recording of a plurality of spoken words;
- using speech recognition software to determine the plurality of spoken words recorded on the audio recording and the time, starting from the beginning of the first digital media file, at which each of the plurality of spoken words is played during playback of the first digital media file;
- transmitting the first digital media file to a remote device;
- receiving from the remote device data identifying one or more portions of the first digital media file that were played on the remote device;
- using speech recognition software and the data received from the remote device to determine the spoken words recorded on the audio recording that were played on the remote device;
- displaying on a computer display the plurality of spoken words on the audio recording; and
- depicting a graphic element on the displayed plurality of spoken words indicating the words of the audio recording that were played on the remote device.

11. The computer implemented method of claim 10, wherein the data received from the remote device comprises one or more playback times at which playback of the first digital media file on the remote device started and ended.

12. The computer implemented method of claim 11, wherein the speech recognition software is used to determine the plurality of spoken words recorded on the audio recording and the time, starting from the beginning of the first digital media file, at which each of the plurality of spoken words is played during playback of the first digital media file, before the first digital media file is transmitted to the remote device.

13. The computer implemented method of claim 11, wherein the speech recognition software is used to determine the plurality of spoken words recorded on the audio recording and the time, starting from the beginning of the first digital media file, at which each of the plurality of spoken words is played during playback of the first digital media file, after the first digital media file is transmitted to the remote device.

14. The computer implemented method of claim 10, wherein the speech recognition software is used to determine the plurality of spoken words recorded on the audio recording and the time, starting from the beginning of the first digital media file, at which each of the plurality of spoken words is played during playback of the first digital media file, before the first digital media file is transmitted to the remote device.

15. The computer implemented method of claim 10, wherein the speech recognition software is used to determine the plurality of spoken words recorded on the audio recording and the time, starting from the beginning of the first digital media file, at which each of the plurality of spoken words is played during playback of the first digital media file, after the first digital media file is transmitted to the remote device.

16. The computer implemented method of claim 10, further comprising receiving a digital file comprising the text of the plurality of spoken words recorded on the audio recording.

17. The computer implemented method of claim 16, further comprising inputting the digital file to the speech recognition software.

18. The computer implemented method of claim 17, further comprising using the digital file to determine the time, starting from the beginning of the first digital media file, at which each of the plurality of spoken words is played during playback of the first digital media file.

19. The computer implemented method of claim 18, further comprising using the time at which each of the plurality of spoken words recorded on the audio recording is located within the first digital media file to determine the spoken words recorded on the audio recording that were played on the remote device.

* * * * *